(12) United States Patent
Blatt et al.

(10) Patent No.: US 7,874,405 B2
(45) Date of Patent: Jan. 25, 2011

(54) BRAKE CARRIER

(75) Inventors: Peter Blatt, Fürth (DE); Markus Harder, Hockenheim (DE); Eugen Kloos, Bensheim (DE); Andreas Steinmetz, Gleishorbach (DE); Andreas Deckhut, Landau i. d. Pf. (DE)

(73) Assignee: WABCO Radbremsen GmbH, Mannheim (DE)

( * ) Notice: Subject to any disclaimer, the term of this patent is extended or adjusted under 35 U.S.C. 154(b) by 687 days.

(21) Appl. No.: 11/575,202

(22) PCT Filed: Sep. 1, 2005

(86) PCT No.: PCT/EP2005/009431

§ 371 (c)(1),
(2), (4) Date: Mar. 13, 2007

(87) PCT Pub. No.: WO2006/032352

PCT Pub. Date: Mar. 30, 2006

(65) Prior Publication Data

US 2007/0267256 A1    Nov. 22, 2007

(30) Foreign Application Priority Data

Sep. 17, 2004    (DE) .................. 10 2004 045 218

(51) Int. Cl.
*F16D 65/092*    (2006.01)
(52) U.S. Cl. ............... 188/73.39; 188/73.31; 188/73.43
(58) Field of Classification Search ................ 188/73.1, 188/73.31, 73.32, 73.33, 73.39, 73.43, 73.44, 188/73.45, 73.46
See application file for complete search history.

(56) References Cited

U.S. PATENT DOCUMENTS

| | | | | | |
|---|---|---|---|---|---|
| 4,220,224 | A | * | 9/1980 | Karasudani | 188/73.39 |
| 5,343,985 | A | * | 9/1994 | Thiel et al. | 188/72.5 |
| 5,467,847 | A | * | 11/1995 | Antony et al. | 188/73.39 |
| 5,564,532 | A | * | 10/1996 | Baba et al. | 188/73.39 |
| 5,979,611 | A | * | 11/1999 | Sasaki et al. | 188/73.43 |
| 6,131,706 | A | * | 10/2000 | Gotti et al. | 188/73.47 |
| 6,354,408 | B1 | | 3/2002 | Bailey et al. | |
| 6,910,555 | B2 | * | 6/2005 | Ciotti et al. | 188/73.47 |
| 2009/0008194 | A1 | * | 1/2009 | Redemann et al. | 188/73.32 |

FOREIGN PATENT DOCUMENTS

| | | |
|---|---|---|
| DE | 3613346 A1 | 10/1987 |
| DE | 4126339 A1 | 2/1993 |
| DE | 4303417 A1 | 8/1994 |
| DE | 69514482 T2 | 1/2000 |
| DE | 10202778 A1 | 7/2003 |
| EP | 0641949 A1 | 3/1995 |
| EP | 0709592 A2 | 5/1996 |
| EP | 0752541 A1 | 1/1997 |
| EP | 0826894 A1 | 3/1998 |
| GB | 1173410 | 12/1969 |
| GB | 1470919 | 4/1977 |

* cited by examiner

*Primary Examiner*—Thomas J Williams
(74) *Attorney, Agent, or Firm*—Schwabe, Williamson & Wyatt, P.C.

(57) ABSTRACT

Embodiments of the present invention provide a brake carrier for a disk brake, which comprises a flange facing in parallel to the brake disk plane. The brake carrier comprises a flange facing having at least two sections that are configured on respective shoulders on the side of the brake carrier facing away from the brake disk.

20 Claims, 3 Drawing Sheets

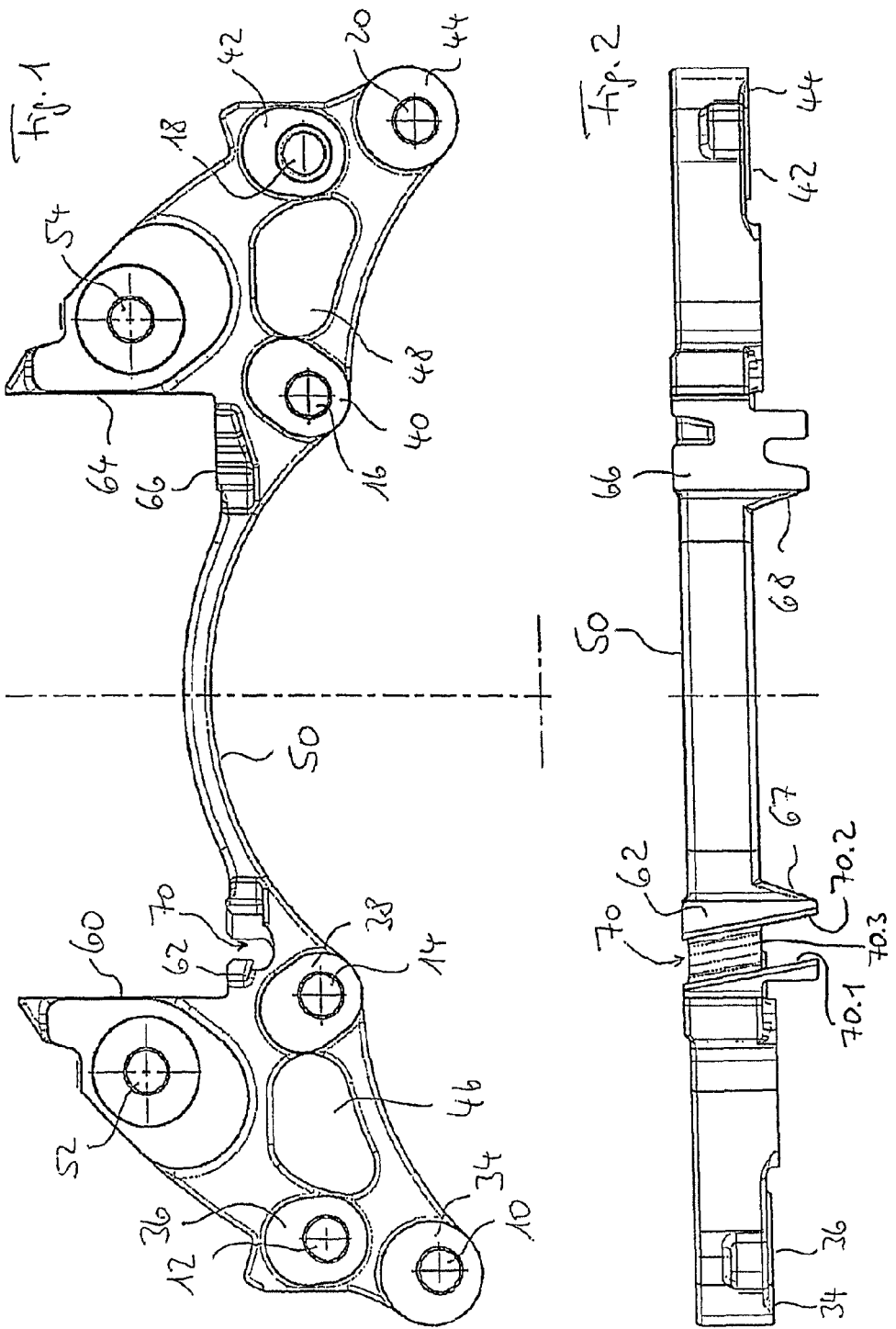

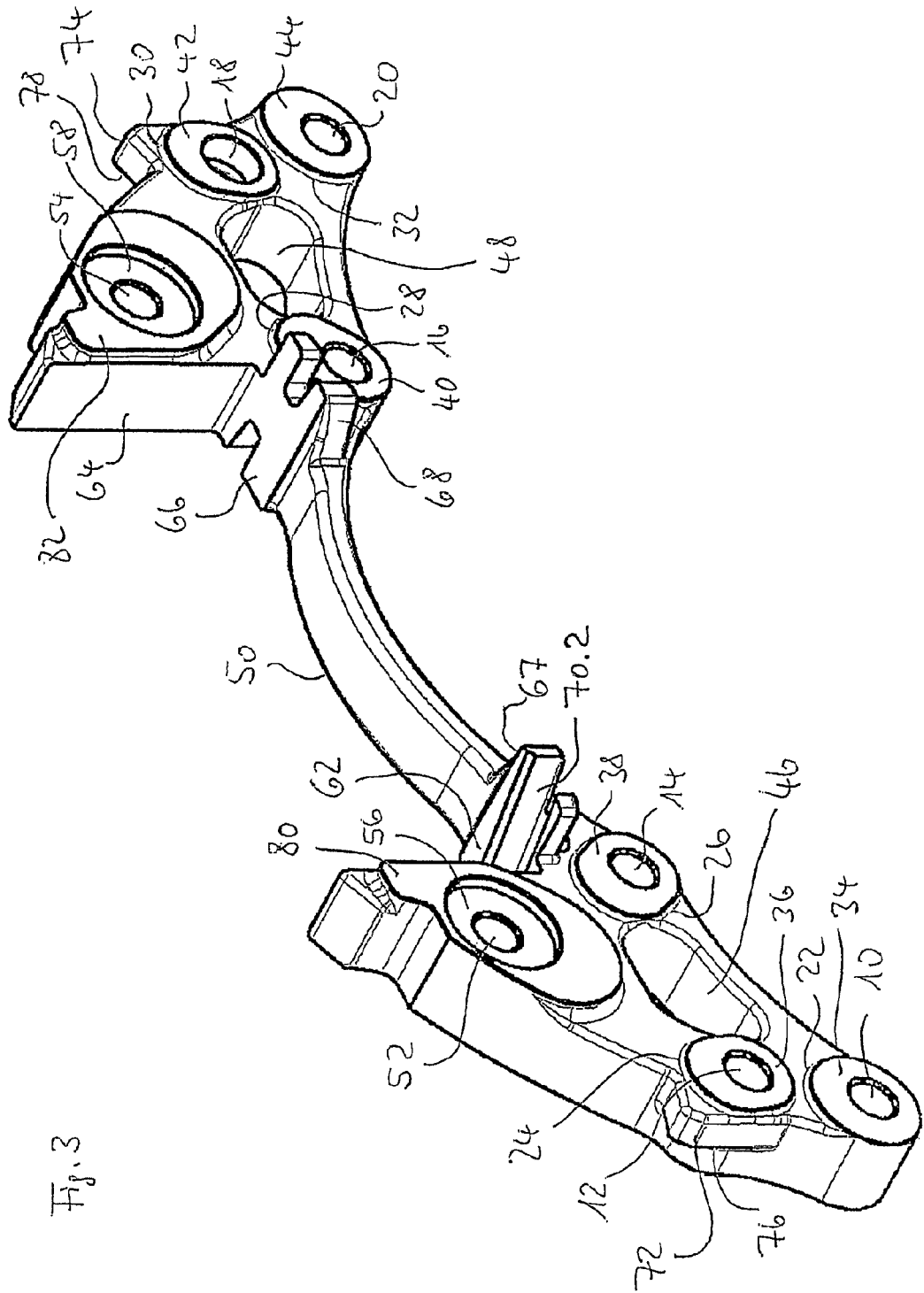

BRAKE CARRIER

CROSS REFERENCE TO RELATED APPLICATIONS

The present application is a national phase entry of, and claims priority under 35 U.S.C. §120 to, International Patent Application No. PCT/EP2005/009431, filed Sep. 1, 2005, entitled "Bremsenträger," which designates the United States of America and which claims priority to German Patent Application No. 102004045218.0, filed Sep. 17, 2004, entitled "Bremsenträger," the entire contents and disclosures of which are hereby incorporated by reference in their entirety.

TECHNICAL FIELD

Embodiments of the present invention relate to the field of mechanical brakes, and, more specifically, to a brake carrier for a disk brake.

BACKGROUND

A brake carrier serves, among other things, to attach the disk brake caliper—generally by bolting it on—to the fixed part of an axle assembly or to an axle flange. Such a brake carrier may be found in German Patent No. 695 14 482 T2, for example. The brake carrier described therein is plate-shaped and does not project beyond the brake disk, but it is not suitable for commercial vehicles because it is too unstable and fails to fulfill functions that are important for commercial vehicles.

Other known brake carriers are, for example, frame-shaped and grasp the brake disk. They serve to hold and guide brake pads on both sides. The brake pads are pressed axially against the brake disk by means of a mechanical tensioning system found in the brake caliper as well as via the brake caliper that is seated on slide pins. Peripheral braking forces are transferred onto the axle assembly via the brake carrier that is axially bolted onto the axle assembly.

Due to the heavy demands placed on them, such brake carriers are, especially when used in commercial vehicles, made of cast material and take up a substantial amount of space. In addition, the use of such a material increases their weight and therefore requires a substantial amount of effort to manufacture. The amount of effort needed to manufacture them is in particular very great because conventionally the entire surface of the side of the brake carrier that faces away from the brake disk lies up against and is bolted onto a corresponding axle assembly surface. These surfaces must be especially smooth, which necessitates a substantial amount of manufacturing effort. In addition, surfaces that are part of the radial and lateral guide and support areas for the brake pads must be particularly smooth, as must the collars against which each slide pin with its protective cap for the brake caliper is screwed. Furthermore, the amount of energy required for manufacturing is increased by the fact that conventional brake carriers are only set up either for brakes on the left side or for brakes on the right side of a vehicle, which means that different embodiments must be manufactured and stored.

When the entire surface of the brake carrier lies up against the axle assembly, a great deal of manufacturing effort is required because relatively large surface areas lie up against each other. If these surfaces are not completely smooth, cracks form between the parts that are to be flanged together. As a result, corrosion and rust damage occur and tension is placed on the brake that can cause the caliper to stick or become immobilized. Operational reliability is thereby jeopardized.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

FIG. 1 illustrates a schematic view of a brake carrier viewed in an axial direction with regard to the brake disk in accordance with various embodiments of the present invention;

FIG. 2 illustrates a schematic top view of a brake carrier in accordance with various embodiments of the present invention;

FIG. 3 illustrates a schematic perspective view of a brake carrier in accordance with various embodiments of the present invention;

DETAILED DESCRIPTION OF EMBODIMENTS OF THE INVENTION

Figure 4:
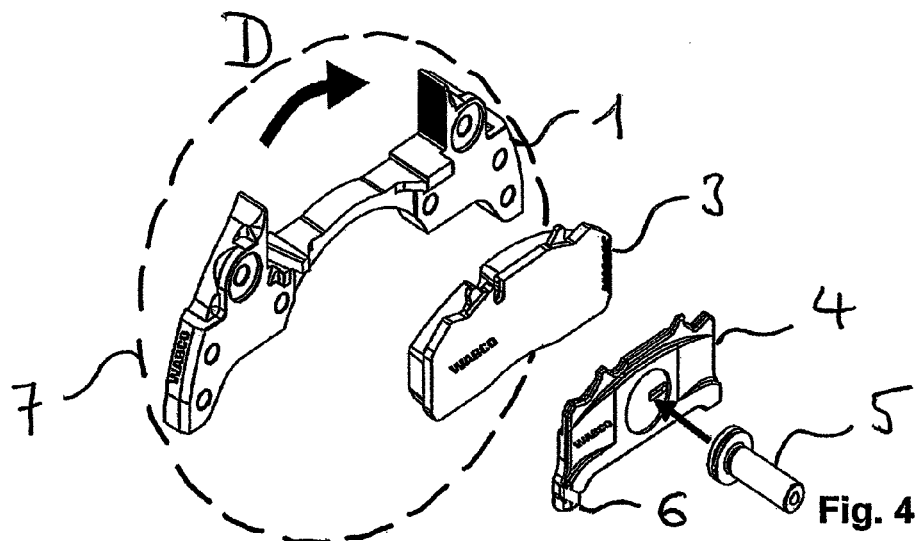
FIG. 4 illustrates a schematic exploded representation of a brake carrier together with other operational parts of a brake in accordance with various embodiments of the present invention.

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" means A or B. For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)". For the purposes of the description, a phrase in the form "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention improve conventional brake carriers so that material and weight are saved, mechanical processing is simplified, and operational reliability is increased.

In an embodiment, the flange facing of a brake carrier comprises at least two parts that are each found on one of the shoulders located on the side of the brake carrier that faces away from the brake disk. In other words, in an embodiment, the shoulders have frontal surfaces that are the only surfaces that lie against the side of the axle assembly flange that is across from the shoulders. Thus, in an embodiment, it is only necessary to machine the aforementioned frontal surfaces of the shoulders. The amount of effort needed for manufacturing thereby decreases. Also, in an embodiment, there is less brake carrier material between the shoulders, which leads to savings in material and thus weight relative to conventional brake carriers. Since the entire side of the brake carrier that faces away from the brake disk need not be machined in order for it to lie against the axle assembly flange, it is significantly easier to adhere to very narrow tolerances. By adhering to more narrow tolerances, the formation of cracks is actively prevented, and corrosion or rust damage, along with their effects on operational reliability described above, are also hindered.

Embodiments of the invention have several advantages over full-surface adjoining surfaces such as those provided by conventional brakes. On the one hand, the use of the shoulders means that the same stability is achieved as with solid material but using less material and weight. In addition, the surface area that needs to be mechanically processed is reduced. Furthermore, greater braking reliability is achieved. Since with full-surface adjoining regions there can be differing machining quality between one manufacturer's axle assembly and another manufacturer's brake carrier, the crack formation mentioned above cannot be excluded. This is, however, prevented or reduced when the adjoining surface areas are limited to the shoulders. In addition, better local force connections between the parts can be achieved via the tightening torque that the brake or axle manufacturer provides with the flanging screws.

Thus, embodiments of the present invention provide a brake carrier for a commercial vehicle disk brake in which the brake caliper grasps the brake disk like a frame, with a flange facing lying in parallel to the brake disk plane, whereby the brake carrier has no parts that project beyond the brake disk when installed. In other words, in an embodiment, the brake carrier is plate-shaped. Its purpose is to hold or guide the brake pad on the tensioning side and, if applicable, a pressure plate, but not to hold or guide a brake pad on the rim side. This leads to significant advantages, especially for larger brakes such as those used for commercial vehicles.

In an embodiment, both flange facing parts preferably lie in one plane. The brake carrier is thereby, in an embodiment, suitable for attachment to the flange of an axle assembly that is smooth across its entire surface.

In an embodiment of the invention, at least one of the shoulders surrounds a recess for a retaining screw like a ring. In an embodiment, such a feature ensures that the brake carrier is not warped when tightening the screw.

According to an embodiment of the invention, at least one guide piece located on the side of the brake carrier that faces away from the brake disk is provided in order to guide a brake pressure plate. Because of this guide piece, the brake carrier need not be so thick as to include a guide assembly for guiding the brake pad and the pressure plate in areas that are located axially behind one another. Instead, in an embodiment, the brake carrier can be reduced by the thickness required for guiding the pressure plate because that part of the guide assembly is formed on the guide piece. Overall, then, the brake carrier is of lesser thickness, saving material and thus weight.

In an embodiment, the guide groove may be situated at an angle with regard to a rotational axis of the brake disk. In an embodiment, it may therefore be located, especially with forward movement, on the brake disk inlet side. It may thus be positioned at an angle against the brake disk inlet. In an embodiment, the pressure plate may also be continuously supported at an angle. It may therefore be pulled upon when braking occurs.

In an embodiment, when there is reverse movement, the groove wall on the disk inlet side serves to support the pressure plate. In other words, this groove wall prevents any excessive sideward movement on the part of the pressure plate, since it functions as an angled stop piece for the pressure plate.

According to another embodiment of the invention, at least one groove wall of the guide groove is to be situated higher than the bottom of the guide groove. In other words, the groove is, according to this embodiment of the invention, set up in an "open" manner along at least one portion of its length. The reason for this feature is that a groove guide with a U-shaped bottom surface can be used to guide a pressure plate by means of a shoulder piece. Since this guide area in particular exerts a significant influence on the unimpeded operation/functioning of the pressure plate, disruptive influences of any kind, such as, for example, pad debris and dirt from operation, can have a negative influence on the pressure plate's free movement. Since a completely closed groove tends toward accumulation of dirt, and can thus cause the pressure plate being guided in it to get stuck, according to an embodiment of the invention, the groove is preferably set up as an open guide at least where the guide wall projects higher than on a plate-shaped brake carrier. In other words, the guide walls for the pressure plate that is hung inside are not closed but are rather formed on both sides by ribs that project forward and against the pressure plate's shoulder in accordance with the brake disk's rotational direction. This means that, in the region in which it projects, there is an open guide on the plate-shaped brake carrier in which dirt does not collect because movement and circulation during operation already cause foreign particles such as dirt and moisture to be automatically removed from the guide. A self-cleaning guide is thereby created by operation of the vehicle, specifically in the region in which the pressure plate moves in the direction of the brake disk due to pad and disk wear.

In an embodiment, a guide groove is provided on the guide piece. An especially simple concept is thereby implemented. Namely, in an embodiment, only one brake carrier blank, with a guide piece, need be manufactured by casting. The guide groove can then be made on the guide piece without a great deal of effort, for example by means of milling.

According to an embodiment of the invention, a first guide piece is provided on the disk inlet side and a second guide piece on the disk outlet side. This design makes it possible to set up the brake carrier for brakes located on the left side or for brakes located on the right side. It is simply a matter of, when the final decision about the side is made, to utilize the brake carrier with the guide groove on the appropriate side. Of course it is also possible to make two guide grooves. The brake carrier could then be used on both the right and the left side as desired.

According to an embodiment, a through opening and/or a region of decreased material strength outside of the main force flow lines when dissipating the braking power is provided.

In other words, in an embodiment, the brake carrier has a "ribbed structure" in which the ribs align with the main force flow lines. In embodiments, outside of these main force flow lines the brake carrier can be made substantially thinner (decreased wall thickness) in order to conserve material, or a through opening can be made in it, which leads to substantial savings of material and thus in weight.

According to an embodiment, a stop piece that limits displacement of the brake caliper in the brake disk's axial direction is provided. Such a stop piece serves to prevent the brake caliper from squashing or lifting a slide pin protective cap out of its holder, depending on the direction in which the brake caliper may be excessively displaced. This excessive displacement is prevented by the stop piece according to an embodiment of the invention.

Also provided in accordance with an embodiment is a shoulder that limits displacement of the brake caliper in both directions along a rotational axis of the brake disk. In other words, prevention of excessive displacement in both directions is provided according to an embodiment of the invention, for example in order to protect a protective cap both from being squashed and from being lifted out of its holder.

According to an embodiment of the invention, at least two shoulders are provided that are symmetrical to each other, for example one such shoulder on the disk inlet side and another on the disk outlet side.

Figure 5:
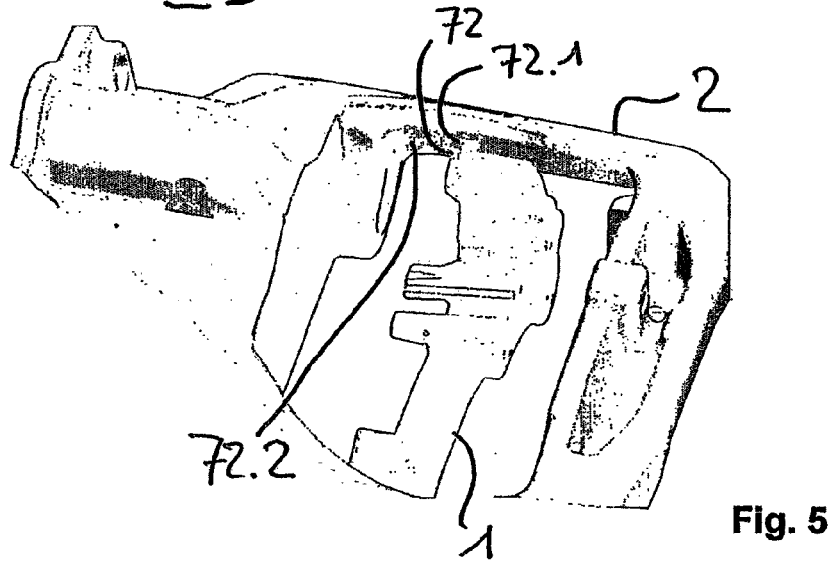
FIGS. 5 and 6 illustrate schematic perspective views of brake parts in various operating states.
Figure 6:
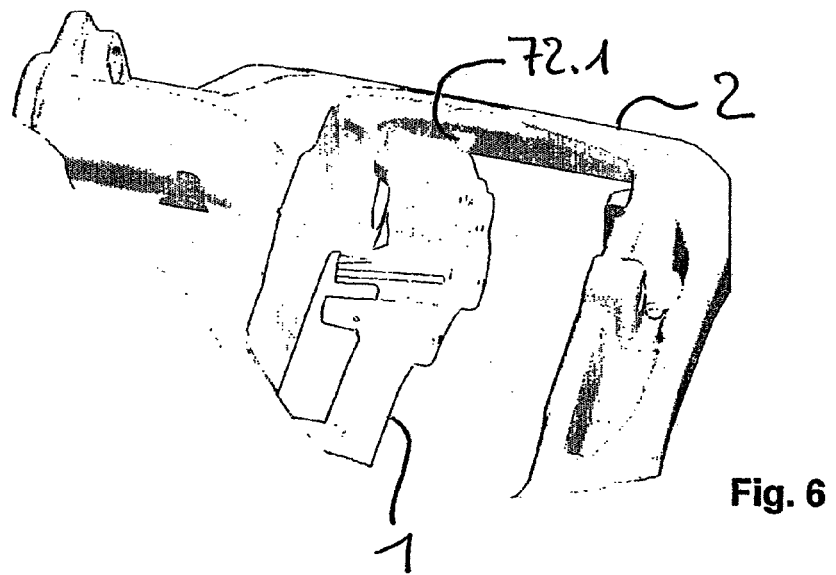

As shown in the Figures, brake carrier 1 serves to hold or carry a brake caliper 2, a brake pad 3 and a pressure plate 4 against which a tension-applying rod 5 presses when braking occurs (see FIGS. 4, 5, and 6). In order to be secured, brake carrier 1 lies against an axle flange (not shown) on the side of brake carrier 1 represented at the lower portion of FIG. 2. FIG. 1 also schematically illustrates a brake disk 7 in phantom. The brake disk 7 may not be to scale.

As shown in FIGS. 1 and 3, six recesses (specifically threaded holes) 10, 12, 14, 16, 18, 20, into which retaining screws (not shown) are screwed, serve to secure the carrier. The recesses are each surrounded, ring-like, by a shoulder 22, 24, 26, 28, 30, 32. The frontal surfaces 34, 36, 38, 40, 42, 44 of the shoulders are mechanically processed, for example by means of milling, so that they are flat to within very narrow tolerances. This ensures that the brake carrier lies flat on the corresponding flange facing of the axle assembly. For this assembly only the aforementioned frontal surfaces 34, 36, 38, 40, 42, 44 need be machined, and not other regions of the side of the brake carrier that faces toward the flange facing of the axle assembly. Machining is thereby greatly facilitated and the necessary tolerances can more easily be adhered to.

In an embodiment, brake carrier 1 comprises window-like recesses 46, 48 that contribute to additional savings of material and thereby to reduction in weight. Since only the frontal surfaces 34, 36, 38, 40, 42, 44 lie up against the flange facing of the axle assembly, window-like recesses 46, 48 can be created without negatively influencing operation. For the same reason, in an embodiment, a connector yoke 50 can be very narrow.

In an embodiment, slide pin seats 52, 54 that are surrounded by machined collars 56, 58 serve to guide the aforementioned brake caliper.

In an embodiment, brake pad 3 is, when installed, supported and guided by surfaces 60, 62, 64, 66. In particular surfaces 60 and 64 hereby take up the peripheral braking forces that are transferred to the axle assembly via the screws in recesses 10, 12, 14, 16, 18, 20. One of the main force flow lines thereby runs, for example, from surface 64 via the slide pin that is located in recess 54 up to shoulder 30. It should be expressly stated that both connector yoke 50 and window-like recess 48 lie outside of this force flow line. The same type of situation applies, of course, for window-like recess 46.

In an embodiment, on the side facing the axle assembly, guide pieces 67, 68 are provided on brake carrier 1. In an embodiment, a guide groove 70 that is set up at an angle with regard to a rotational axis of the brake disk is milled into the guide piece 67. This guide groove 70 serves, especially in the region that projects above or away from the side of the brake carrier that faces the axle assembly, to support and/or guide the aforementioned pressure plate. Because the guide groove 70 is especially formed in the region that projects above or away from the side facing the axle assembly, a substantial amount of material and thus weight can be saved. In particular, connector yoke 50 need not be, for example, formed in such a way that guide groove 70 could be made on it.

Brake carrier 1 shown in the Figures is a left-side brake carrier; that is, a brake carrier that is situated on the side of a vehicle that is on the left when facing forward. Accordingly, the rotational direction D of the brake disk is clockwise. Pressure plate 4 may be placed, using shoulder 6, into guide groove 70 on the disk inlet side.

If, on the other hand, the brake carrier is to be placed on the right side of the vehicle, then a groove corresponding to guide groove 70 may simply be made on guide piece 68. The brake carrier shown in the drawing can thus be universally used without making any major adjustments. Inventory requirements are thereby substantially reduced because two different brake carriers need no longer be manufactured and stored.

As can be seen especially from FIG. 2, groove walls 70.1 and 70.2 project above a groove bottom 70.3 of guide groove 70, so that the self-cleaning effect described in detail above may be achieved.

The brake carrier shown in FIG. 3 has two shoulder stops 72, 74. These two shoulder stops 72, 74 both form a stop piece 76, 78 on the sides of those shoulder stops that face the brake disk. Stop pieces 76, 78 are situated in such a way that brake caliper 2, which grasps the brake disk like a frame, is prevented from excessive displacement toward the tensioning side because it strikes stop pieces 76, 78. This prevents protective caps from slide pins in the slide pin seats 52, 54 from being lifted off. Stop pieces 80, 82 serve a similar purpose. However, they prevent excessive displacement of the brake caliper 2 in the direction of the rim side, which could lead to the protective caps being squashed.

The surfaces of shoulder stops 72, 74 that face the tensioning side could also serve as displacement limiting stops for caliper 2. For this purpose, as seen in FIGS. 5 and 6, shoulder stop 72 works together with stop pieces 72.1 and 72.2, which are located on caliper 2, for example. Stop piece 72.1 thereby serves to limit displacement of the caliper 2 toward the tensioning side. Stop piece 72.2, for its part, serves to limit displacement of the caliper 2 toward the rim side. The corresponding extreme positions of caliper 2 are shown in FIGS. 5 and 6. The two shoulder stops 72 and 74 are symmetrically situated with regard to a symmetry line that divides brake carrier 1 into an inlet side and an outlet side.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A brake carrier for a disk brake device that includes a brake disk and a caliper that grasps the brake disk in a frame-like manner, the brake carrier comprising:
    a flange facing positioned parallel to a plane defined by the brake disk, the flange facing comprising at least two parts wherein each of the at least two parts is configured on a respective shoulder situated on a side of the brake carrier facing away from the brake disk;
    an assembly configured for guiding and supporting a brake pad in circumferential and radial directions, wherein the assembly comprises no parts that project beyond the brake disk when installed; and
    at least one guide piece configured to guide positioning of a brake pressure plate and located on the side of the brake carrier that faces away from the brake disk,
    wherein said guide piece comprises a guide groove, and
    wherein said guide groove is configured at an angle with regard to a rotational axis of the brake disk.

2. The brake carrier of claim 1, wherein said plane is a first plane and wherein said at least two parts each comprise a flat surface feature, both of which lie on a second plane.

3. The brake carrier of claim 1, wherein at least one of said respective shoulders surrounds in a ring-like manner a recess configured to receive a retaining screw.

4. The brake carrier of claim 1, wherein said guide groove comprises a groove bottom and at least one groove wall and wherein said at least one groove wall projects farther than a groove bottom in at least one direction.

5. The brake carrier of claim 1, wherein said brake carrier defines a disk inlet side and a disk outlet side, said brake carrier further comprising a first guide piece located at said disk inlet side and a second guide piece located at said disk outlet side.

6. The brake carrier of claim 1, further comprising at least one through opening passing through said brake carrier and located outside a main force flow line of said brake carrier.

7. The brake carrier of claim 1, wherein said brake carrier has a defined material strength and wherein said brake carrier further comprises a region of reduced material strength with respect to said defined material strength which is located outside a main force flow line of said brake carrier.

8. The brake carrier of claim 1, further comprising at least one stop piece that limits displacement of the caliper in an axial direction of the brake disk.

9. The brake carrier of claim 8, wherein said at least one stop piece comprises at least two stop pieces that are symmetrical to each other.

10. The brake carrier of claim 1, further comprising a shoulder stop that limits displacement of the brake caliper in both directions along a rotational axis of the brake disk.

11. A disk brake device, comprising:
    a brake disk;
    a caliper that grasps the brake disk in a frame-like manner; and
    a brake carrier coupled to the caliper, the brake carrier comprising:
        a flange facing positioned parallel to a plane defined by the brake disk, the flange facing comprising at least two parts wherein each of the at least two parts is configured on a respective shoulder situated on a side of the brake carrier facing away from the brake disk;
        an assembly configured for guiding and supporting a brake pad in circumferential and radial directions, wherein the assembly comprises no parts that project beyond the brake disk when installed; and
        at least one guide piece configured to guide positioning of a brake pressure plate and located on the side of the brake carrier that faces away from the brake disk,
        wherein said guide piece comprises a guide groove, and
        wherein said guide groove is configured at an angle with regard to a rotational axis of the brake disk.

12. The disk brake of claim 11, wherein said plane is a first plane and wherein said at least two parts each comprise a flat surface feature, both of which lie on a second plane.

13. The disk brake of claim 11, wherein at least one of said respective shoulders surrounds in a ring-like manner a recess configured to receive a retaining screw.

14. The disk brake of claim 11, wherein said guide groove comprises a groove bottom and at least one groove wall and wherein said at least one groove wall projects farther than a groove bottom in at least one direction.

15. The disk brake of claim 11, wherein said brake carrier defines a disk inlet side and a disk outlet side, said brake carrier further comprising a first guide piece located at said disk inlet side and a second guide piece located at said disk outlet side.

16. The disk brake of claim 11, further comprising at least one through opening passing through said brake carrier and located outside a main force flow line of said brake carrier.

17. The disk brake of claim 11, wherein said brake carrier has a defined material strength and wherein said brake carrier further comprises a region of reduced material strength with respect to said defined material strength which is located outside a main force flow line of said brake carrier.

18. The disk brake of claim 11, further comprising at least one stop piece that limits displacement of the caliper in an axial direction of the brake disk.

19. The disk brake of claim 18, wherein said at least one stop piece comprises at least two stop pieces that are symmetrical to each other.

20. The disk brake of claim 11, further comprising a shoulder stop that limits displacement of the brake caliper in both directions along a rotational axis of the brake disk.

* * * * *